(12) United States Patent
BenHanokh et al.

(10) Patent No.: US 11,687,266 B2
(45) Date of Patent: Jun. 27, 2023

(54) MANAGING DEDUPLICATION OPERATIONS BASED ON A LIKELIHOOD OF DUPLICABILITY

(71) Applicant: RED HAT, INC., Raleigh, NC (US)

(72) Inventors: Gabriel Zvi BenHanokh, Tel-Aviv (IL); Orit Wasserman, Mitzpe Aviv (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/330,977

(22) Filed: May 26, 2021

(65) Prior Publication Data

US 2022/0382473 A1 Dec. 1, 2022

(51) Int. Cl.
*G06F 3/06* (2006.01)

(52) U.S. Cl.
CPC .......... *G06F 3/0641* (2013.01); *G06F 3/0608* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,116,249 B2 | 10/2006 | McCanne et al. | |
| 7,747,584 B1 | 6/2010 | Jernigan, IV | |
| 9,542,411 B2 | 1/2017 | Akirav et al. | |
| 9,558,201 B2 * | 1/2017 | Ben-Shaul | G06F 3/0641 |
| 9,830,229 B2 | 11/2017 | Fagiano et al. | |
| 10,275,474 B2 | 4/2019 | Provenzano | |
| 10,838,753 B2 | 11/2020 | Tsirkin et al. | |
| 10,877,680 B2 * | 12/2020 | Zhong | G06F 3/0619 |
| 2013/0339316 A1 * | 12/2013 | Hirsch | G06F 3/0641 |
| | | | 707/E17.032 |
| 2017/0123711 A1 * | 5/2017 | Kathpal | G06F 3/0608 |
| 2019/0258500 A1 * | 8/2019 | Tsirkin | G06F 9/45558 |
| 2020/0233752 A1 | 7/2020 | Wong et al. | |

OTHER PUBLICATIONS

Luo, S., et al., "Boafft: Distributed Deduplication for Big Data Storage in the Cloud," IEEE Transactions on Cloud Computing, Jan. 2015, vol. 61, No. 11, http://citeseerx.ist.psu.edu/viewdoc/download?doi=10.1.1.735.3603&rep=rep1&type=pdf.

* cited by examiner

*Primary Examiner* — Michael Alsip
(74) *Attorney, Agent, or Firm* — Kilpatrick Townsend & Stockton LLP

(57) ABSTRACT

Deduplication operations can be managed based on a likelihood of duplicability. For example, a computing device can generate, by a container of a storage system, an indication of duplicability corresponding to a likelihood of duplicability for the data unit in the storage system. The computing device can transmit the indication of duplicability to a storage node of the storage system for performing an operation based on the indication of duplicability.

20 Claims, 3 Drawing Sheets

MANAGING DEDUPLICATION OPERATIONS BASED ON A LIKELIHOOD OF DUPLICABILITY

TECHNICAL FIELD

The present disclosure relates generally to data deduplication. More specifically, but not by way of limitation, this disclosure relates to managing deduplication operations based on a likelihood of duplicability.

BACKGROUND

Containers are relatively isolated virtual-environments that are typically deployed from image files. Containers can include data units that can be written to storage nodes of a system. If a container requests a same data unit to be stored multiple times in the system, it may be beneficial to deduplicate the data unit.

Deduplication can involve storing an instance of a data unit and having other instances of the data unit point to that instance. To determine whether an instance of a data unit already exists in a system, a hash of the data unit can be calculated and compared to a list of hash values for data unit that exist in the system. If the hash is in the list, it can be determined that the data unit already exists in the system, so only a reference pointing to the data unit can be stored, instead of storing the data unit itself again. Deduplication reduces storage requirements when the same data unit is requested to be stored multiple times in the system.

DETAILED DESCRIPTION

Figure 1:
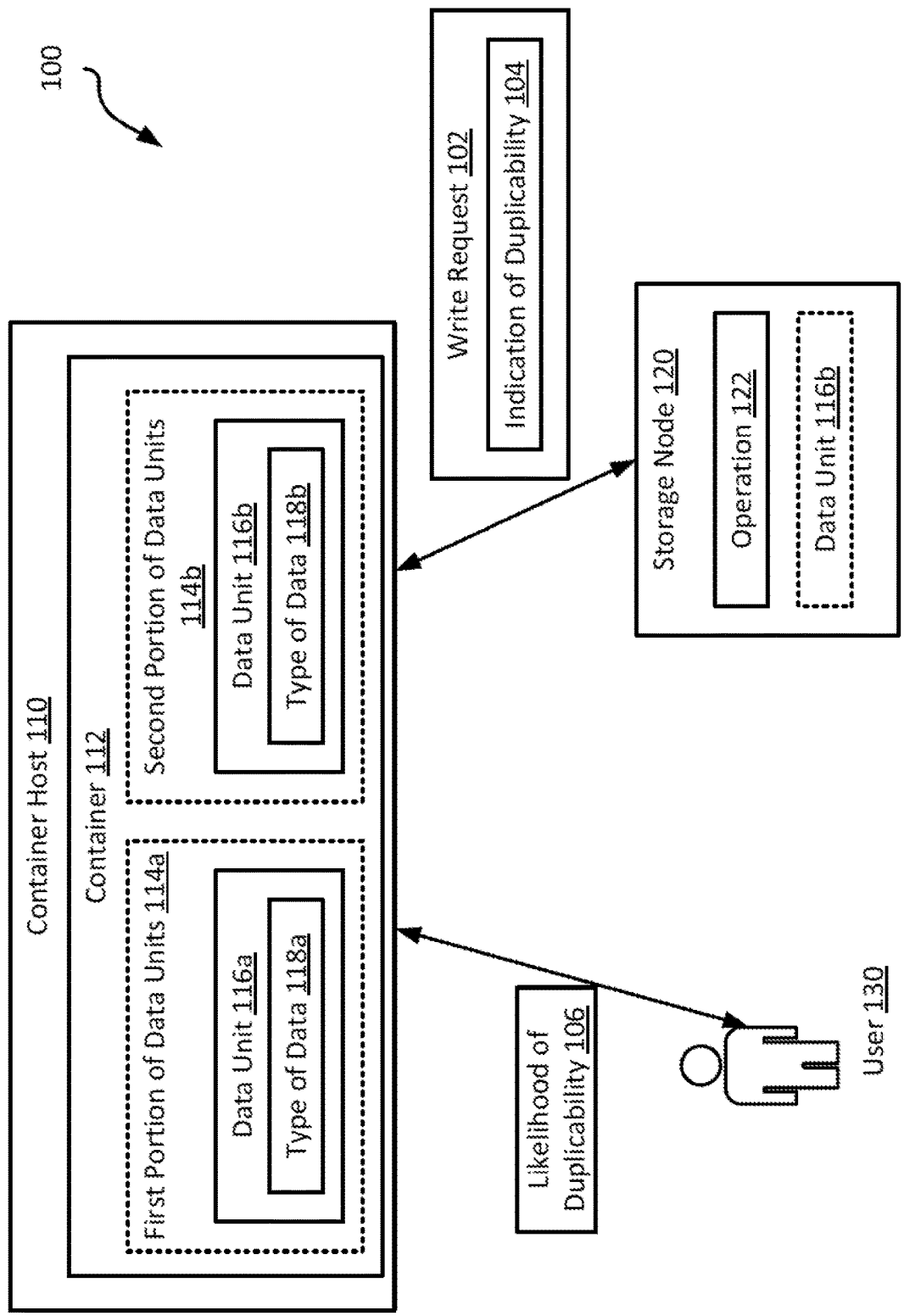
FIG. 1 is a block diagram of an example of a storage system for implementing managing deduplication operations based on a likelihood of duplicability according to some aspects of the present disclosure.

Systems that perform deduplication operations often perform deduplication for each write request regardless of the data included in the write request. However, some data is more likely to be duplicated in a system than other data. For example, data units for operating systems, software applications, and base container images are more likely to be repeated, while data units for software application generated data, data stores, and databases are less likely to be repeated. Evaluating the system for a duplicate version of a data unit for each write request can consume excessive amounts of system resources, particularly for data units that have a low likelihood of being duplicated in the system.

Some examples of the present disclosure can overcome one or more of the abovementioned problems by providing a system that performs deduplication operations based on a likelihood of a data unit to be duplicated in the system. For example, a container of the system can generate a write request for a data unit of the container. The container can also generate an indication of duplicability corresponding to a likelihood of duplicability for the data unit in the system. The container can determine a type of data to which the data unit corresponds, and determine the likelihood of duplicability based on the type of data. For example, operating system data, base image data, and software applications can be data associated with a high likelihood of duplicability, while database data, data store data, software application generated data can be associated with a low likelihood of duplicability. The container can transmit the write request including the indication of duplicability to a storage node of the system for performing an operation based on the write request and the indication of duplicability. The operation may be a deduplication operation if the indication of duplicability is below a threshold. If the indication of duplicability is above the threshold, the storage node can store the data unit without checking the system for a duplicate version of the data unit. This can conserve system resources by only checking for duplicated data units when the data unit has a high likelihood of being duplicated in the system. Additionally, space required to store a table of hash values for data units can be reduced, since only hash values for data units that are likely to be duplicated can be included in the table.

One particular example can involve a storage system that includes a container and a storage node. The container can generate a write request for a data unit corresponding to operating system data. The container can determine that, since the data unit is for operating system data, that the likelihood of duplicability is high for the data unit. The container can transmit the write request and an indication of the high likelihood of duplicability to the storage node. The storage node can receive indication of or determine an operation to perform for the data unit based on the indication the high likelihood of duplicability. The operation can involve the storage node evaluating the storage system for a duplicate version of the data unit. Upon determining the duplicate version exists, the storage node can discard the data unit without storing it again. The storage system has the ability to perform deduplication, but may only do so when the data unit has a high likelihood of being duplicated. As a result, the storage system can conserve system resources for other processes.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a storage system 100 for implementing management of deduplication operations based on a likelihood of duplicability according to some aspects of the present disclosure. The storage system 100 may be a software-defined storage system, a storage server, or a storage array. The storage system 100 can include a container host 110 and a storage node 120. Examples of the container host 110 can include a desktop computer, a laptop, a mobile phone, a server, or any other device capable of running a container. The storage node 120 can be a physical server for storing data. The container host 110 and the storage node 120 can communicate over a network, such as a local area network (LAN) or the Internet.

The container host 110 can include a container 112. The container 112 can generate a write request 102 for a data unit 116*a* of the container 112. The write request 102 can be for storing the data unit 116 in the storage node 120.

In some examples, the container 112 can also generate an indication of duplicability 104 for the data unit 116*a*. The indication of duplicability 104 can correspond to a likelihood of duplicability 106 for the data unit 116a in the storage system 100. For example, a data unit that is more likely to be duplicated in the storage system 100 may have an indication of duplicability 104 that is greater than a data unit that is less likely to be duplicated. Examples of data units that are more likely to be duplicated can include operating system data, base image data, and software applications, such as browsers, document-generating applications, email applications, etc. Examples of data units that are less likely to be duplicated can include database data, data store data, software application generated data (e.g., as a result of calculations and other operations), etc.

The container 112 may determine the likelihood of duplicability 106 based on a type of data 118a to which the data unit 116a corresponds. For example, the container 112 can determine the type of data 118a for the data unit 116a is operating system data. As a result, the container 112 can determine the likelihood of duplicability 106 to be a high likelihood of duplicability. A high likelihood of duplicability may be represented qualitatively or quantitatively, such as a percentage above 50%. The container 112 may alternatively determine a type of data 118b for a data unit 116b is data store data, so the likelihood of duplicability 106 is a low likelihood of duplicability, such as below 50%.

The container 112 may alternatively determine the likelihood of duplicability 106 by receiving the likelihood of duplicability 106 for the data unit 116a from a user 130. The user 130 can be a creator of the container 112, and the user 130 may generate tags for the data of the container 112 to indicate the likelihood of duplicability 106. A first tag may indicate a low likelihood of duplicability and a second tag may indicate a high likelihood of duplicability. The container 112 can determine the tag associated with the data unit 116a and then determine the likelihood of duplicability 106 based on the tag.

The container 112 may include a first portion of data units 114a that have the likelihood of duplicability 106 above a threshold (e.g., 50%) and a second portion of data units 114b that have the likelihood of duplicability 106 below the threshold. The first portion of data units 114a can include data units that include the tag associated with a high likelihood of duplicability and the second portion of data units 114b can include data units that include the tag associated with a low likelihood of duplicability.

In some examples, the container 112 can include the indication of duplicability 104 with the write request 102. The container 112 can transmit the write request 102 and the indication of duplicability 104 to the storage node 120. The storage node 120 can receive the write request 102 and determine an operation 122 to be performed based on the indication of duplicability 104. The container 112 may include, with the write request 102, an indication of the operation 122 to be performed. The storage node 120 may alternatively include knowledge of thresholds for the indication of duplicability 104 that correspond to different operations.

As an example, the container 112 can generate the write request 102 for the data unit 116a with the indication of duplicability 104 indicating a likelihood of duplicability of 70%. The container 112 can determine the indication of duplicability 104 is above a threshold of 50%, so the operation 122 should involve the storage node 120 evaluating the storage system 100 for a duplicate version of the data unit 116a. If the storage node 120 determines the duplicate version of the data unit 116a exists in the storage system 100, the storage node 120 can discard the data unit 116a and not store it again. If the storage node 120 determines the duplicate version of the data unit 116a does not exist in the storage system 100, the storage node 120 can store the data unit 116a. This can be considered to be a deduplication operation.

As another example, the container 112 may generate the write request 102 for the data unit 116b with the indication of duplicability 104 indicating a likelihood of duplicability of 23%. The container 112 can determine the indication of duplicability 104 is below the threshold of 50%, so the operation 122 should involve the storage node 120 storing the data unit 116b in the storage node 120. The storage node 120 can store the data unit 116b without evaluating the storage system 100 for a duplicate version since the indication of duplicability 104 is low, which can reduce computation requirements of the storage system 100.

In another example, the container 112 may include a lower threshold and an upper threshold for determining the operation 122 that the storage node 120 is to perform for the write request 102. The indication of duplicability 104 below the lower threshold can result in the container 112 indicating the storage node 120 is to store the data unit of the write request 102. The indication of duplicability 104 above the upper threshold can result in the container 112 indicating the storage node 120 is to evaluate the storage system 100 for a duplicate version of the data unit and to discard the data unit if the duplicate version exists in the storage system 100. If the indication of duplicability 104 is below the lower threshold and the upper threshold, the container 112 can indicate the operation 122 is to involve the storage node 120 storing the data unit and performing a background process at a later time to determine whether a duplicate version of the data unit exists in the storage system 100. If, at the later time, the storage node 120 determines the duplicate version exists, the storage node 120 can then remove the data unit from the storage node 120. Waiting to evaluate for a duplicate version may also reduce the computation requirements of the storage system 100.

FIG. 1 is illustrative and non-limiting. Other examples may include more components, fewer components, different components, or a different arrangement of the components shown in FIG. 1. For example, although the storage system 100 includes one storage node in the example of FIG. 1, the storage system 100 may include a larger number of storage nodes in other examples. Additionally, the container 112 may use persistent volumes for storing data units. A first persistent volume can store data units with a high likelihood of duplicability and a second persistent volume can store data units with a low likelihood of duplicability. The likelihood of duplicability 106 and the indication of duplicability 104 may be expressed as percentages, as qualitative levels (e.g., "high", "medium", or "low"), or as any other suitable representation.

Other examples may additionally relate to virtual machines instead of containers. In such examples, a hypervisor can determine the indication of duplicability that is to be associated with a write request for a data unit.

Figure 2:
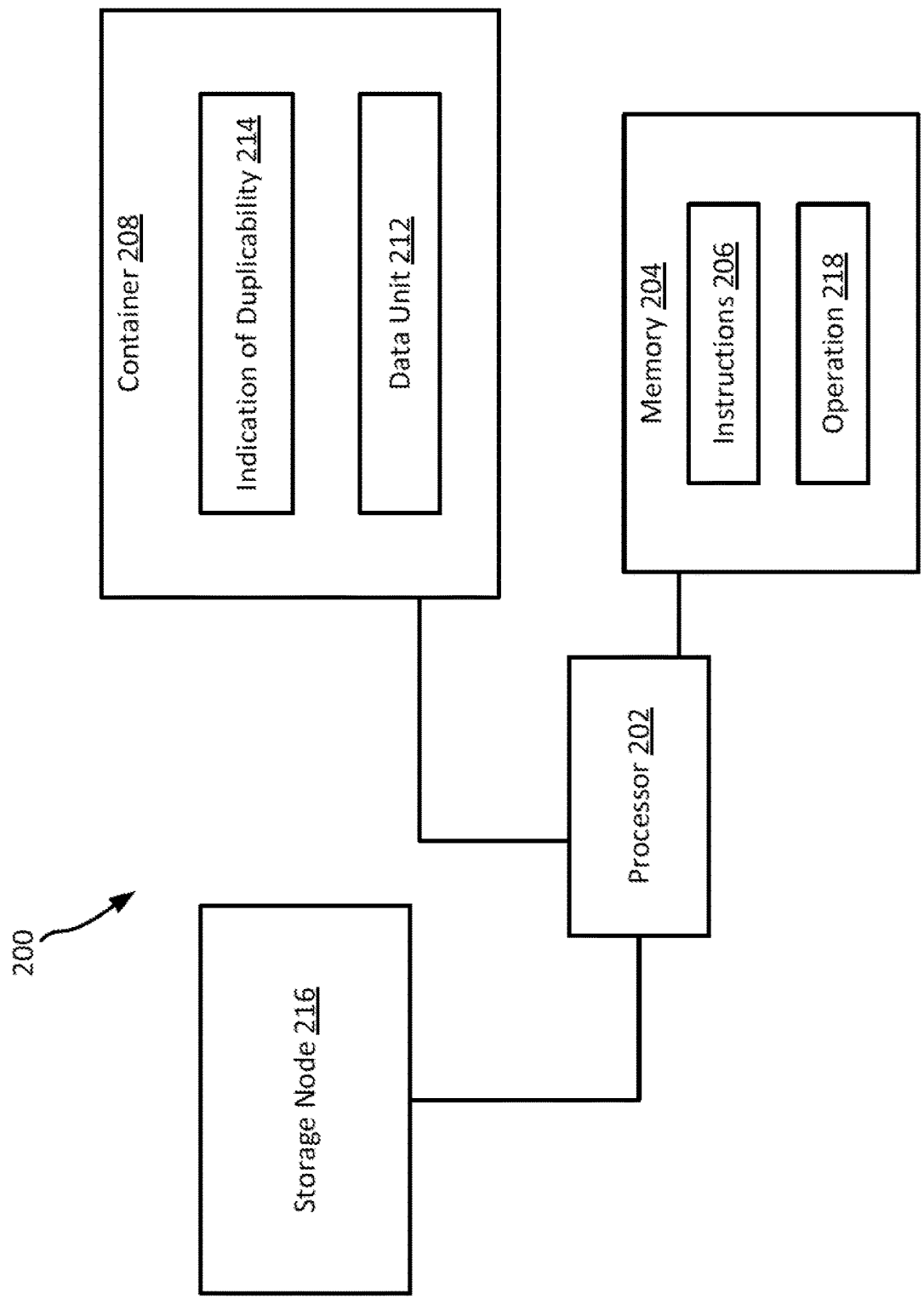
FIG. 2 is a block diagram of another example of storage system for implementing managing deduplication operations based on a likelihood of duplicability according to some aspects of the present disclosure.

FIG. 2 is a block diagram of another example of storage system 200 for implementing managing deduplication operations based on a likelihood of duplicability according to some aspects of the present disclosure. The storage system 200 may be a software-defined storage system. The storage system 200 includes a processor 202. The processor 202 may be part of a container host, such as the container host 110 in FIG. 1.

In this example, the processor 202 is communicatively coupled with a memory 204. The processor 202 can include one processor or multiple processors. Non-limiting examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 can include processor-specific instructions generated by a compiler or an interpreter from code written in any suitable computer-programming language, such as C, C++, C#, etc.

The memory 204 can include one memory or multiple memories. Non-limiting examples of the memory 204 can include electrically erasable and programmable read-only memory (EEPROM), flash memory, or any other type of non-volatile memory. At least some of the memory 204 includes a non-transitory computer-readable medium from which the processor 202 can read the instructions 206. The non-transitory computer-readable medium can include electronic, optical, magnetic, or other storage devices capable of providing the processor 202 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 206.

In some examples, the processor 202 can execute the instructions 206 to perform operations. For example, the processor 202 can generate, by a container 208 of the storage system 200, an indication of duplicability 214 corresponding to a likelihood of duplicability for the data unit 212 in the storage system 200. The processor 202 can determine the indication of duplicability 214 based on a type of data of the data unit 212, or based on a tag associated with the data unit 212 when the container 208 was created. The processor 202 can transmit the indication of duplicability 214 to a storage node 216 of the storage system 200 for performing an operation 218 based on the write request 210 and the indication of duplicability 214. The indication of duplicability 214 may be transmitted with a write request for storing the data unit 212 in the storage node 216. The operation 218 can involve the storage node 216 evaluating the storage system 200 for a duplicate version of the data unit 212 and discarding the data unit 212 if the duplicate version exists. The operation 218 may alternatively involve storing the data unit 212 without evaluating the storage system 200 if the indication of duplicability 214 is low.

Figure 3:
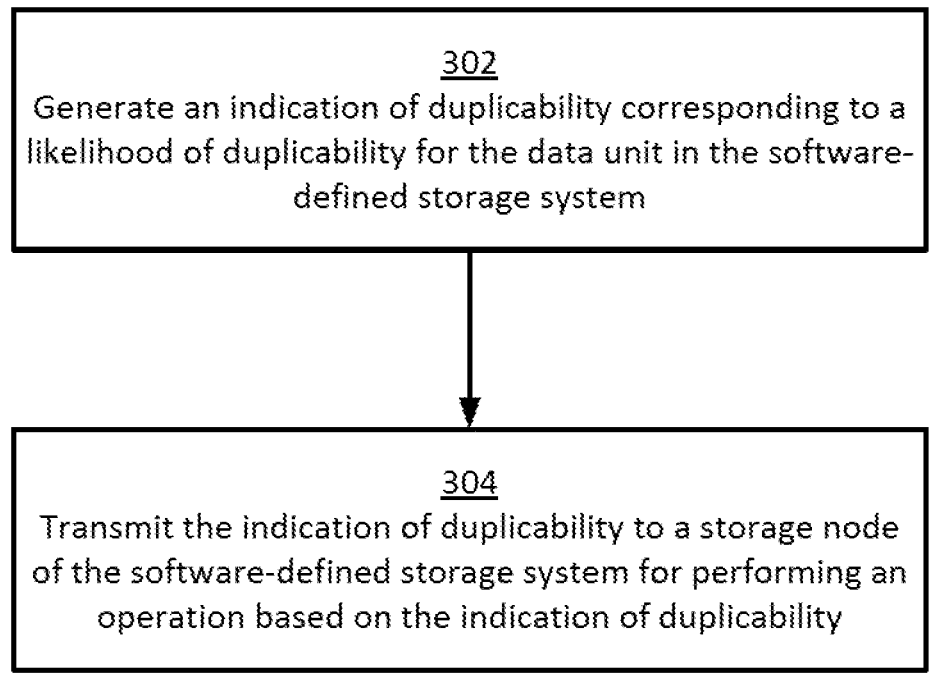
FIG. 3 is a flow chart of a process for managing deduplication operations based on a likelihood of duplicability according to some aspects of the present disclosure.

The processor 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 302, the processor 202 can generate, by a container 208 of a storage system 200, an indication of duplicability 214 corresponding to a likelihood of duplicability for the data unit 212 in the storage system 200. The processor 202 may determine a type of data of the data unit 212, such as operating system data, a base image, data store data, or software application generated data, to determine the indication of duplicability 214. The indication of duplicability 214 can be expressed as a percentage, with higher percentages corresponding to a higher likelihood of duplicability.

In block 304, the processor 202 can transmit the indication of duplicability 214 to a storage node 216 of the storage system 200 for performing an operation 218 based on the indication of duplicability 214. The indication of duplicability 214 may be transmitted with a write request for storing the data unit 212 in the storage node 216. The processor 202 may determine whether the indication of duplicability 214 is above or below a threshold to determine the operation 218 that the storage node 216 is to perform. For example, the indication of duplicability 214 being below the threshold can indicate the storage node 216 is to store the data unit 212 without further processing. The indication of duplicability 214 being above the threshold can indicate the storage node 216 is to evaluate the storage system 200 for a duplicate version of the data unit 212 before storing the data unit 212. Differentiation between the operation 218 based on the indication of duplicability 214 can reduce processing performed by the storage system 200 for data that is likely to not be repeated, and therefore reduce a usage of system resources.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
   a processor; and
   a memory including instructions that are executable by the processor for causing the processor to:
   generate, by a container of a storage system, a write request for storing a data unit in a storage node of the storage system, the write request including an indication of duplicability corresponding to a likelihood of duplicability for the data unit in the storage system, the likelihood of duplicability being a qualitative or quantitative representation of the data unit being duplicated in the storage system; and
   transmit, by the container, the write request to the storage node of the storage system for performing an operation based on the indication of duplicability prior to evaluating the storage system for a duplicate of the data unit and storing the data unit in the storage node.

2. The system of claim 1, wherein the indication of duplicability indicates the likelihood of duplicability exceeds a threshold and the memory further includes instructions that are executable by the processor to cause the processor to perform the operation by indicating:
   the storage system is to be evaluated for a duplicate version of the data unit; and
   in response to determining the storage system includes the duplicate version, the data unit is to be discarded.

3. The system of claim 1, wherein the indication of duplicability indicates the likelihood of duplicability is below a threshold and the memory further includes instructions that are executable by the processor to cause the processor to perform the operation by storing the data unit in the storage node.

4. The system of claim 1, wherein the memory further includes instructions that are executable by the processor for causing the processor to determine the likelihood of duplicability by:
   determining the data unit corresponds to a particular type of data; and
   determining the likelihood of duplicability based on the particular type of data.

5. The system of claim 1, wherein the memory further includes instructions that are executable by the processor for causing the processor to determine the likelihood of duplicability by receiving the likelihood of duplicability for the data unit from a user.

6. The system of claim 1, wherein the container comprises a first portion of data units having the likelihood of duplicability above a threshold and a second portion of data units having the likelihood of duplicability below the threshold.

7. The system of claim 6, wherein the first portion of data units comprises a base image for the container.

8. A method comprising:
generating, by a container of a storage system, a write request for storing a data unit in a storage node of the storage system, the write request including an indication of duplicability corresponding to a likelihood of duplicability for the data unit in the storage system, the likelihood of duplicability being a qualitative or quantitative representation of the data unit being duplicated in the storage system; and
transmitting, by the container, the write request to the storage node of the storage system for performing an operation based on the indication of duplicability prior to evaluating the storage system for a duplicate of the data unit and storing the data unit in the storage node.

9. The method of claim 8, wherein the indication of duplicability indicates the likelihood of duplicability exceeds a threshold and the method further comprises performing the operation by indicating:
the storage system is to be evaluated for a duplicate version of the data unit; and
in response to determining the storage system includes the duplicate version, the data unit is to be discarded.

10. The method of claim 8, wherein the indication of duplicability indicates the likelihood of duplicability is below a threshold and the method further comprises performing the operation by storing the data unit in the storage node.

11. The method of claim 8, further comprising determining the likelihood of duplicability by:
determining the data unit corresponds to a particular type of data; and
determining the likelihood of duplicability based on the particular type of data.

12. The method of claim 8, further comprising determining the likelihood of duplicability by receiving the likelihood of duplicability for the data unit from a user.

13. The method of claim 8, wherein the container comprises a first portion of data units having the likelihood of duplicability above a threshold and a second portion of data units having the likelihood of duplicability below the threshold.

14. The method of claim 13, wherein the first portion of data units comprises a base image for the container.

15. A non-transitory computer-readable medium comprising program code that is executable by a processor for causing the processor to:
generate, by a container of a storage system, a write request for storing a data unit in a storage node of the storage system, the write request including an indication of duplicability corresponding to a likelihood of duplicability for the data unit in the storage system, the likelihood of duplicability being a qualitative or quantitative representation of the data unit being duplicated in the storage system; and
transmit, by the container, the write request to the storage node of the storage system for performing an operation based on the indication of duplicability prior to evaluating the storage system for a duplicate of the data unit and storing the data unit in the storage node.

16. The non-transitory computer-readable medium of claim 15, wherein the indication of duplicability indicates the likelihood of duplicability exceeds a threshold and the non-transitory computer-readable medium further includes program code that is executable by the processor for causing the processor to perform the operation by indicating:
the storage system is to be evaluated for a duplicate version of the data unit; and
in response to determining the storage system includes the duplicate version, the data unit is to be discarded.

17. The non-transitory computer-readable medium of claim 15, wherein the indication of duplicability indicates the likelihood of duplicability is below a threshold and the non-transitory computer-readable medium further includes program code that is executable by the processor to cause the processor to perform the operation by storing the data unit in the storage node.

18. The non-transitory computer-readable medium of claim 15, further including program code that is executable by the processor for causing the processor to determine the likelihood of duplicability by:
determining the data unit corresponds to a particular type of data; and
determining the likelihood of duplicability based on the particular type of data.

19. The non-transitory computer-readable medium of claim 15, further including program code that is executable by the processor for causing the processor to determine the likelihood of duplicability by receiving the likelihood of duplicability for the data unit from a user.

20. The non-transitory computer-readable medium of claim 15, wherein the container comprises a first portion of data units having the likelihood of duplicability above a threshold and a second portion of data units having the likelihood of duplicability below the threshold.

* * * * *